US012785256B2

(12) United States Patent
Surma

(10) Patent No.: US 12,785,256 B2
(45) Date of Patent: Nov. 3, 2026

(54) ANTENNA AND MOBILE COMMUNICATION CELL SITE

(71) Applicant: Telefonaktiebolaget LM Ericsson (publ), Stockholm (SE)

(72) Inventor: Markus Surma, Bad Aibling (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 18/700,247

(22) PCT Filed: Oct. 27, 2021

(86) PCT No.: PCT/EP2021/079876

§ 371 (c)(1),
(2) Date: Apr. 10, 2024

(87) PCT Pub. No.: WO2023/072387

PCT Pub. Date: May 4, 2023

(65) Prior Publication Data

US 2025/0226565 A1 Jul. 10, 2025

(51) Int. Cl.

*H01Q 1/24* (2006.01)
*H01Q 1/12* (2006.01)
*H01Q 1/42* (2006.01)

(52) U.S. Cl.

CPC ........... *H01Q 1/246* (2013.01); *H01Q 1/1207* (2013.01); *H01Q 1/42* (2013.01)

(58) Field of Classification Search

CPC ...... H01Q 1/12; H01Q 1/1207; H01Q 1/1214; H01Q 1/1221; H01Q 1/1228; H01Q 1/246; H01Q 1/42; H01Q 1/427; H01Q 1/428; H01Q 15/14; H01Q 19/10; H01Q 19/108; H01Q 23/00

See application file for complete search history.

(56) References Cited

U.S. PATENT DOCUMENTS 10,122,077 B2 11/2018 Frohler et al.
10,158,165 B2 12/2018 Sledkov et al.
10,431,877 B2 10/2019 Varnoosfaderani et al.
2016/0099505 A1 4/2016 Junttila et al.
2017/0222313 A1 8/2017 Markof et al.
2021/0057796 A1 2/2021 Xu et al.
2021/0126351 A1* 4/2021 Hou ......................... H01Q 1/02

FOREIGN PATENT DOCUMENTS

CN 2729929 Y 9/2005

OTHER PUBLICATIONS

International Search Report and Written Opinion for International Patent Application No. PCT/EP2021/079876, mailed Jul. 13, 2022, 13 pages.

* cited by examiner

*Primary Examiner* — Robert Karacsony
(74) *Attorney, Agent, or Firm* — Withrow & Terranova, PLLC

(57) ABSTRACT

An antenna, in particular for a mobile communication cell site has two rails, a cover and a radiator assembly with a plurality of radiators and a reflector. The rails are parallel to each other, wherein the cover extends from one of the two rails to the other one of the two rails, and wherein the radiator assembly is located between the rails and is attached to one or both of the two rails. Further, a mobile communication cell site is shown.

19 Claims, 5 Drawing Sheets

ANTENNA AND MOBILE COMMUNICATION CELL SITE

This application is a 35 U.S.C. § 371 national phase filing of International Application No. PCT/EP2021/079876, filed Oct. 27, 2021, the disclosure of which is incorporated herein by reference in its entirety.

TECHNICAL FIELD

The invention relates to an antenna as well as a mobile communication cell site comprising an antenna.

BACKGROUND

Commonly, antennas for mobile communication cell sites comprise an antenna housing which protects the radiators of the antenna from the environment and allows the antenna to be mounted to a pole or the like of the cell site.

Examples for antennas with housings are, for example, described in U.S. Pat. Nos. 10,122,077 B2 and 10,431,877 B2.

However, such antennas have the drawback that the housing for the antennas can only be used for a specific antenna as their length or width cannot be adjusted. Further, transport of these housings is inefficient, as they are very bulky.

SUMMARY

It is therefore the object of the invention to provide an antenna as well as a mobile communication cell site that has flexible dimensions, easy to manufacture and can be transported efficiently.

For this purpose, an antenna, in particular for a mobile communication cell site is provided, comprising two rails, a cover and a radiator assembly with a plurality of radiators and a reflector. The rails are parallel to each other, wherein the cover extends from one of the two rails to the other one of the two rails, and wherein the radiator assembly is located between the rails and is attached to one or both of the two rails.

The underlying idea of the invention is the realization that the antenna, in particular a housing of the antenna, can be provided modularly by separate parts. As the rails can be provided in various length and as the cover can be provided in various width, the dimensions of the antenna can be chosen flexibly without a redesign of the housing. At the same time, the antenna can be shipped in a disassembled state, reducing the space needed for shipping.

The radiator assembly may be supported by the rails and/or the cover may be attached to one or both of the two rails.

In particular, the cover is a radome for the radiators of the radiator assembly and/or the cover has a U-shaped cross-section.

To protect the radiator assembly from adverse environmental conditions, the rails and the cover may define a housing with an interior volume, wherein the radiator assembly is located within the housing.

The rails form, for example, the sidewalls of housing.

In an aspect, the antenna has a front, a back and two head ends, wherein the rails extend in the longitudinal direction between the two head ends, in particular fully, and/or in the height direction between the front and the back, yielding a very stable housing.

In an embodiment, the rails comprise each a first mounting section for the cover and a second mounting section for the radiator assembly, allowing for different covers and/or radiator assemblies to be inserted.

To reduce the material needed for the housing, the first mounting section may be located at the front end of the cross-section of the respective rail and/or the first mounting section may comprise a first groove for receiving the cover.

In another embodiment, the cover has two parallel edges extending in the longitudinal direction having a geometry in the cross-section complimentary to the geometry of the first grooves of the first mounting section, in particular wherein the edges of the cover are inserted in the first grooves via the end faces of the respective rail. This way, an easy but reliable connection is achieved.

For example, the cover is insertable into the first groove via the end face of the rail.

In an aspect, the second mounting section comprises a second groove for receiving the radiator assembly, in particular wherein a collar of the radiator assembly, in particular of the reflector, or a mounting piece of the radiator assembly are located in the groove, leading to a reliable fixation of the radiator assembly.

For example, an insulating material, in particular an insulation foil, is present in the second groove between the rail and the reflector preventing a galvanic contact between the reflector and the rail to improve the linearity of the RF contacts and prevent passive intermodulation.

For a very stable fixation of the radiator assembly, the second mounting section may comprise a latching element, wherein the radiator assembly, in particular a mounting bridge of the radiator assembly, engages with the latching element.

The reflector may be attached to the bridge by hooks, bolts or the like.

In another aspect, the antenna comprises a back cover attached to one or both of the two rails, in particular at the back end of the cross-section of the respective rail. By use of a back cover, the housing can be fully sealed around its periphery.

The back cover may be a sub-reflector.

For the ease of installation, the rails may comprise a third mounting section for the back cover, in particular wherein the third mounting section may comprise a third groove for receiving the back cover.

For example, the back cover has two parallel edges having a geometry in the cross-section complimentary to the geometry of the third groove of the third mounting section, in particular wherein the edges of the cover are inserted in the third grooves via the end faces of the rails.

Further, a gasket may be provided in the third groove, in particular attached to the back cover.

In another embodiment, the rails each have a fourth mounting section, wherein the fourth mounting section comprises a fourth groove, in particular wherein a nut is located in the fourth groove for mounting elements to the rail. This way, a versatile and easy-to-use system for attaching further parts to the antenna is provided.

For example, the nut has a threaded hole. The fourth groove may be open to the outer side and/or back of the respective rail.

In order to obtain an active antenna, the antenna may comprise an electronic module, in particular a transceiver, attached to the rail via the fourth mounting section, and/or a pole mounting element attached to the rail via the fourth mounting section.

In another aspect, the antenna has at least one stiffener plate located at a head end and fixedly attached to the respective end faces of the two rails, in particular wherein the stiffener plate has at least one opening for a cable or a cable connector. The stiffener plate stiffens the antenna.

In an embodiment, the antenna comprises at least one cap having a base and a collar extending from the edge of the cap, wherein the cap, in particular the base, is attached to an end face of one or both of the two rails and the collar extends around the rail and the cover. This way, the housing is sealed at the head end.

For example, at at least one of the head ends of the antenna, the end face of the rail and the end face of the cover are offset from one another in the longitudinal direction by a distance, in particular wherein the length of the collar of the cap is larger than the distance of the offset. The collar covering the offset allows that materials with different coefficients of thermal expansion can be used for the rails and the cover.

In particular, the length of the collar of the cap is larger than the distance of the offset over the whole temperature range that the antenna is designed for.

In order to allow flexibility in the longitudinal direction, the rails may have an invariant cross-section in the longitudinal direction and/or the rails may be identical to one another.

For example, the rails are made of metal and/or are manufactured by extrusion. Using metal as a material for the rails, the rails may provide electromagnetic shielding as well as transferring and dissipating heat to the outside.

For cost efficiency the cover may be made from a thermoplastic material.

In another embodiment, the rails each have a fifth mounting section for receiving aerodynamically active parts, for example a spoiler, in particular the fifth mounting section having at least one groove and/or being located at the outer side. Using aerodynamically active parts, the wind load on the antenna can be reduced.

In an aspect, the rails have an outer side and an inner side, wherein the second mounting section is provided on the inner side, and/or wherein the fourth mounting section and/or the fifth mounting section is located at the outer side.

For the above mentioned purpose, a mobile communication cell site comprising an antenna as described above is provided.

The features and advantages as discussed with respect to the antenna also apply to the mobile communication cell site and vice versa.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
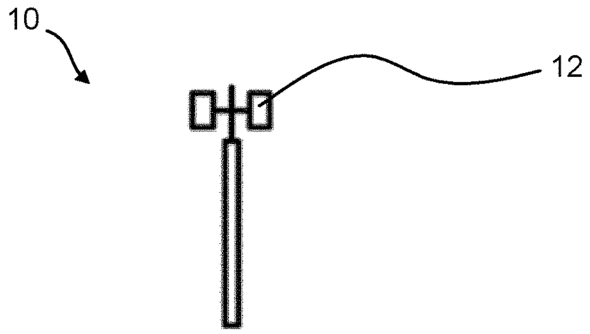
FIG. 1: shows a mobile communication cell site according to the invention with an antenna according to the invention.

FIG. 1 shows a mobile communication cell site 10 having at least one antenna 12.

Figure 2:
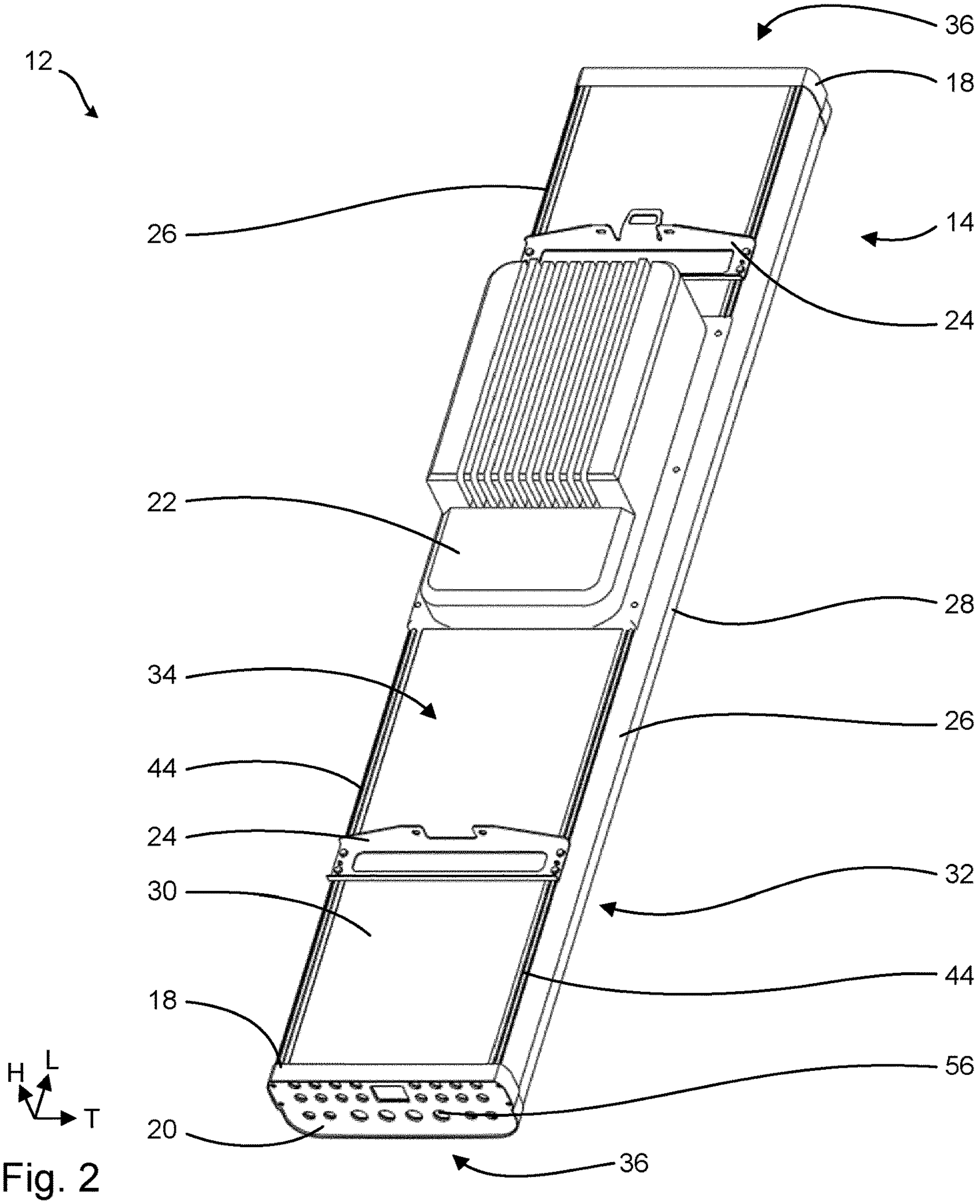
FIG. 2: shows a perspective view of the antenna according to FIG. 1 from the back.

FIG. 2 shows the antenna 12 in a perspective view from the back.

The antenna 12 comprises a housing 14, a radiator assembly 16 (FIG. 6), two caps 18, a stiffener plate 20, an electronic module 22 and two pole mounting elements 24.

The antenna 12 has a longitudinal direction L, a traverse direction T and a height direction H. In the height direction H, the antenna 12 has a front 32 and a back 34, and in the longitudinal direction L the antenna 12 has two head ends 36.

The housing 14 comprises two rails 26, a cover 28 and in the shown embodiment a back cover 30.

The rails 26 extend in the longitudinal direction L from one head end 36 to the other head end 36 and define the antenna 12 in the transverse direction T.

Figure 3:
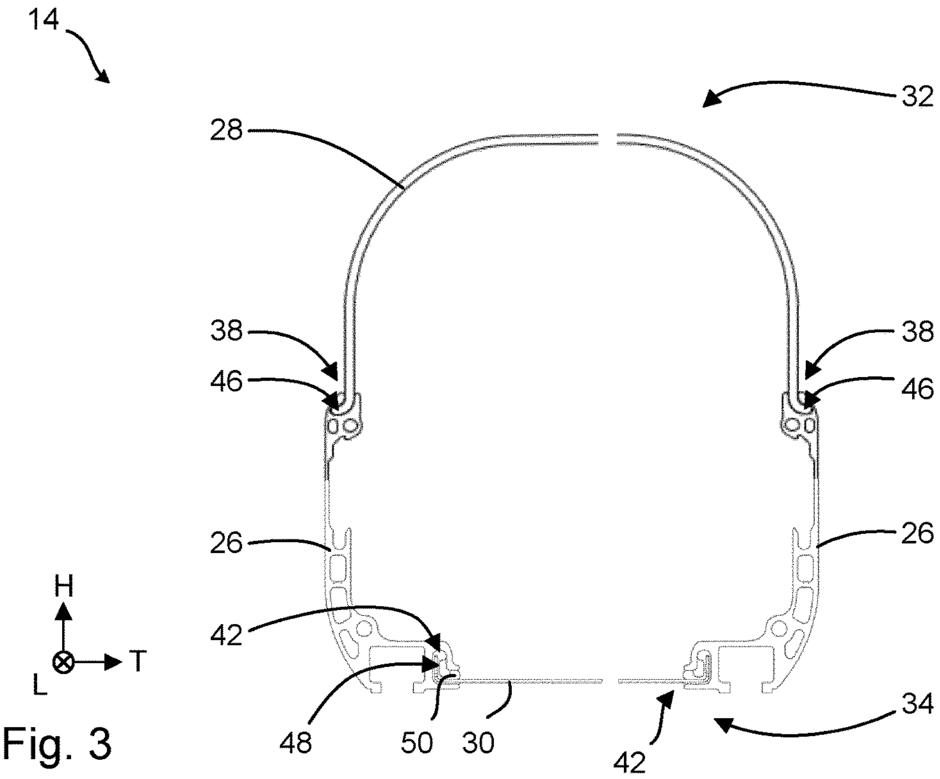
FIG. 3: shows a cross-section of a housing of the antenna according to FIG. 2, FIG. 4: shows a cross-section of a rail of the antenna according to FIG. 2, FIG. 5: shows a cross-sectional view of one of the head ends of the antenna according to FIG. 2, FIGS. 6-8: show cross-sections of the rail and parts of a radiator assembly of the antenna according to FIG. 2, FIG. 9: shows a second embodiment of a rail and a radiator assembly mounted to the rail in a detailed view.

FIG. 3 shows a cross-section through the empty housing 14, thus a cross-section through the rails 26, the cover 28 and the back cover 30.

The cover 28 may have a U-shaped cross-section. It is attached to each one of the rails 26 and extends from one of the rails 26 to the other one of the rails 26 in the traverse direction.

The cover 28 is, for example, a radome and may be made from a thermoplastic material, for example by extrusion.

The back cover 30 is also attached to both of the rails 26, for example on the opposite side of the cover 28, and also extends from one of the rails 26 to the other one of the rails 28.

The length of cover 28 in the longitudinal direction L is shorter than the length of the rails 26, as will be explained later.

Thus, the rails 26 and the cover 28 enclose an interior volume of the housing 14 in between them, the rails 26 forming at least parts of the sidewalls of the housing 14. The cover 28 closes the housing 14 to the front.

Figure 4:
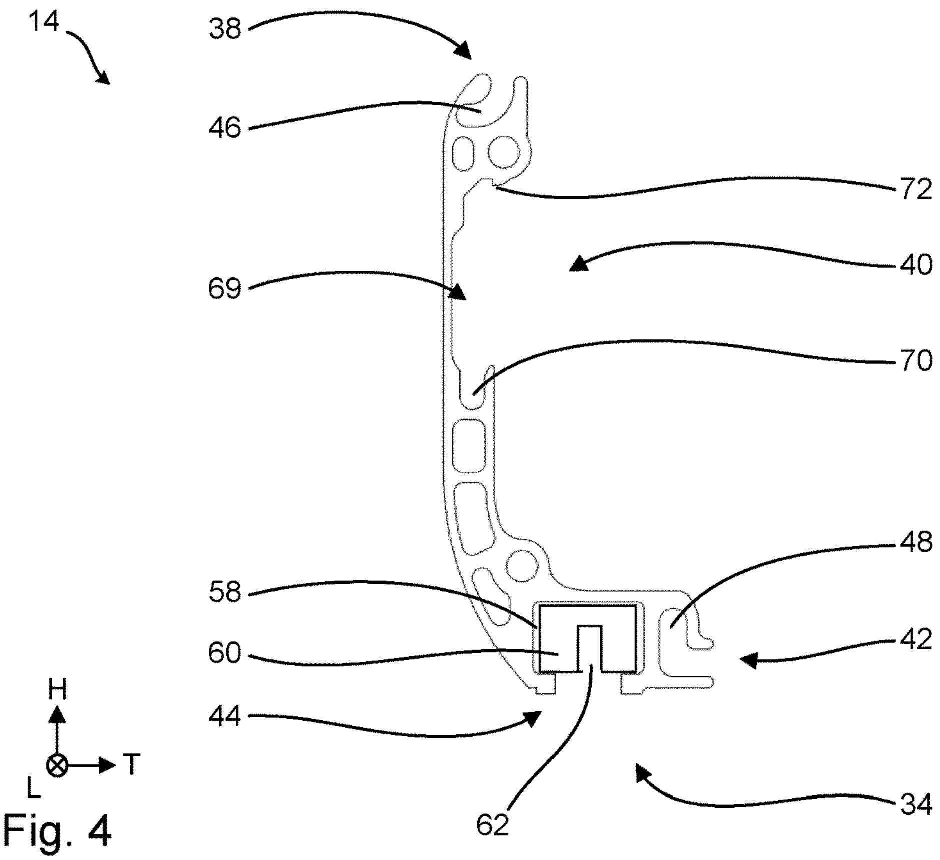

FIG. 4 shows one of the rails 26 in a cross-section.

The rails 26 are, for example, made of metal and are manufactured by extrusion.

The rails 26 have an invariant cross-section in the longitudinal direction L and are identical to one another.

Each of the rails 26 has several mounting sections, namely a first mounting section 38, a second mounting section 40, a third mounting section 42 and a fourth mounting section 44.

The rails 26 have an inner side facing into the interior volume of the housing 14 and an outer side facing to the outside.

Further, the rails 26 have a front end and a back end in the height direction H. In FIGS. 3 and 4, the front end is the upper end, the back end being the lower end.

From front to back, the first mounting section 38 is located at the front end of the rails 26, the second mounting section 40 is located on the inner side of the rails 26, the third mounting section 42 is located at the back end of the rails 26 and the fourth mounting section 44 is located on the outer side of the rails 26.

In the shown embodiment, the second mounting section 40 is closer to the first mounting section than the fourth mounting section 44.

The first mounting section 38 comprises a first groove for receiving the cover 28.

In this disclosure, words like "first", "second", "third", etc. are used for the distinction of the various components and do not imply that there is necessarily the same amount of grooves. For example, the third mounting section 42 comprises one groove, called the third groove for the ease of reference.

To this end, the cover 28 comprises two parallel edges extending in the longitudinal direction L. The edges are formed with a cross-section complementary to the geometry of the cross-section of the first groove 46 of the first mounting section 38.

In the shown embodiment, the first groove 46 is open at the front end of the rail 26 and, for example, extends to the outer side with a curvature.

Likewise, the edge of the cover 28 also extends with a curvature to the outside.

In particular, the geometry of the first groove 46 and the edges of the cover 28 are chosen such that the cover 28 cannot be inserted into the first groove 46 from the front. Instead the cover 28 has to be inserted into the groove 46 from the head ends 36 of the antenna 12, i.e. the end faces of the rails 26. In this way, the cover 28 is securely fastened to the rails 26.

In much the same manner, the back cover 30 is attached to the rails 26.

In the shown embodiment, the third mounting section 42 comprises a third groove 48 extending at the back end of the rails 26.

The third groove 48 extends in the transverse direction T and then upwards in the height direction, i.e. describing and L shape.

Just like the cover 28, the back cover 30 may be made from a thermoplastic material and may be extruded.

The back cover 30 has two parallel edges running in the longitudinal direction L, wherein the edges have a cross-section complementary to the cross-section of the first groove 46 of the third mounting section 42.

Further, in the shown embodiment, a gasket 50 is provided at the edges of the back cover 30 within the third groove 48 to improve the sealing of the back cover 30.

Just as explained in connection with the cover 28, the back cover 30 cannot be inserted from the back end of the rails 26 but has to be inserted into the third groove 48 from the head ends 36 of the antenna 12, i.e. the end faces of the rails 26.

Figure 5:
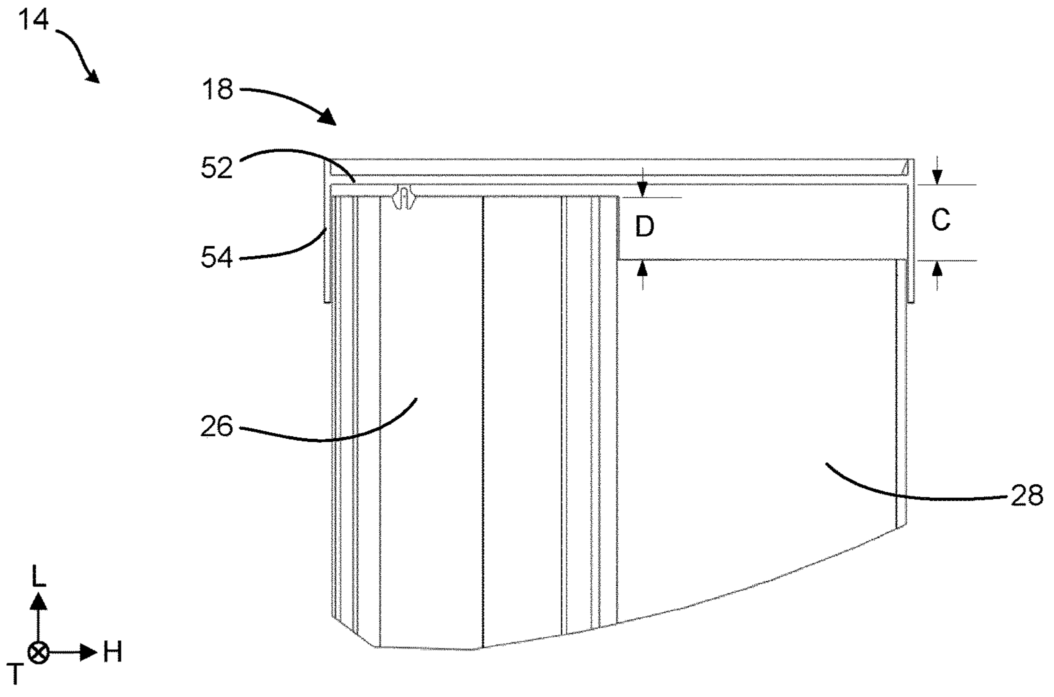

FIG. 5 shows a sectional view of one of the head ends 36 of the antenna seen from the interior of the housing 14.

The head end 36 is provided with the cap 18, wherein the cap 18 comprises a base 52 and a collar 54 extending from the base 52.

The base 52 has a shape corresponding to the cross-sectional shape of the housing 14. Thus, the base 52 covers the head end 36 of the housing 14.

The base 52 is fixed to the end faces of the rails 26, for example by a hook as shown in FIG. 5. Of course, screws, bolts or the like can be used for fixing the base 52 to the rails 26.

The stiffener plate 20 may be part of the base 52 or is the base 52.

Thus, the stiffener plate 20 is fixed to each of the rails 26, more precisely at their end faces, and extends from one of the rails 26 to the other one of the rails 26.

The stiffener plate 20 and/or the base 52 may have at least one, in the shown embodiment a plurality of openings 56. Cables may be fed through the openings 56 or cable connectors can be mounted in the openings 56 to guide cables into the interior volume of the housing 14.

The collar 54 extends from the base 52 or the stiffener plate 20 at the peripheral edge thereof, in particular perpendicularly.

For example, the collar 54 encompasses the base 52 or the stiffener plate 20 fully.

The collar 54 extends from the base 52 or the stiffener plate 20 in the longitudinal direction L having a length C in the longitudinal direction L.

As can be seen in FIG. 5, at the head end 36, the end faces of the rails 26 and the end faces of the cover 28 are not flush with one another but are offset in the longitudinal direction L.

Thus, the end face of the rails 26 and the end face of the cover 28 are spaced apart in the longitudinal direction by a distance D. The length C of the collar 54 is chosen such that it is larger than the distance D of the offset over the whole temperature range the antenna 12 is designed for.

Thus, differences in the change of the lengths of the rails 26 and the cover 28 in the longitudinal direction that are due to differences in the coefficient of thermal expansion can be made up for by the offset and the collar 54.

Turning back to FIG. 4, the fourth mounting section 44 comprises a fourth groove 58 which is open in the height direction H towards the back. The fourth groove 58 has at least one undercut or a dovetailed shape.

The fourth mounting section 44 also comprises at least one nut 60 located in the fourth groove 58.

The nut 60 has a cross-section complementary to the cross-section of the fourth groove 58 to the effect that it can be moved in the longitudinal direction L but is prevented from falling out by the undercut or dovetailed shape of the fourth groove 58.

The nut 60 may comprise attachment means 62, for example a threaded hole that can be accessed from the back of the rail 26.

Using the attachment means 62, components can be attached to the back of the antenna 12 at any position in the longitudinal direction L.

As can be seen in FIG. 2, the electronic module 22 is attached to the backside of the antenna 12 using the fourth mounting sections 44 of the rails 26. In particular, the electronic module 22 is attached to two or three nuts 60 of each of the rails 26.

The electronic module 22 may be a transceiver connected to the radiators of the radiator assembly 16.

Further, the pole mounting elements 24 can also be attached to both of the rails 26 using the fourth mounting sections 44, for example one nut 60 in each of the fourth grooves 58.

In FIG. 2, two pole mounting elements 24 are shown that extend in the traverse direction and comprise fixation elements for fixing the antenna 12 to a pole or the like of the cell site 10.

Using the fourth mounting section 44, namely the moveable nuts 60, the electronic module 22 and in particular the pole mounting elements 24 can be adjusted in their position along the longitudinal direction L so that the antenna 12 can be mounted easily to any kind of pole of the cell site 10.

Figure 6:
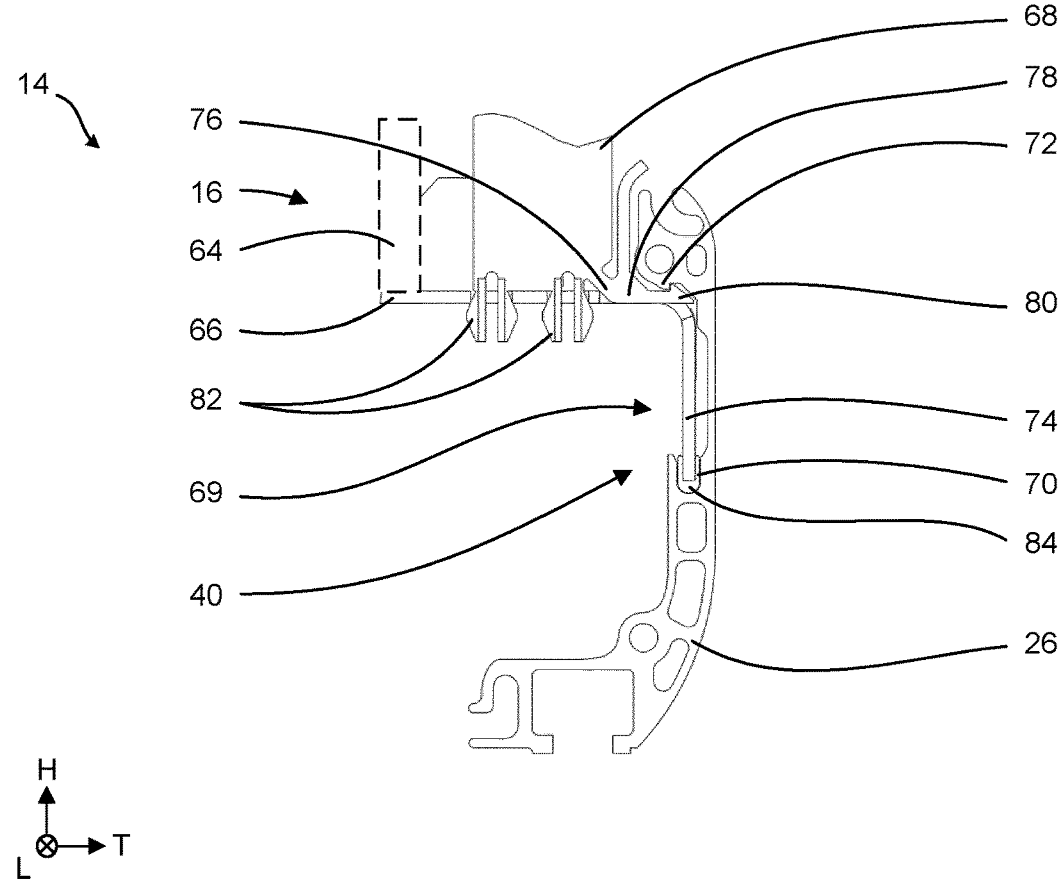
Figure 7:
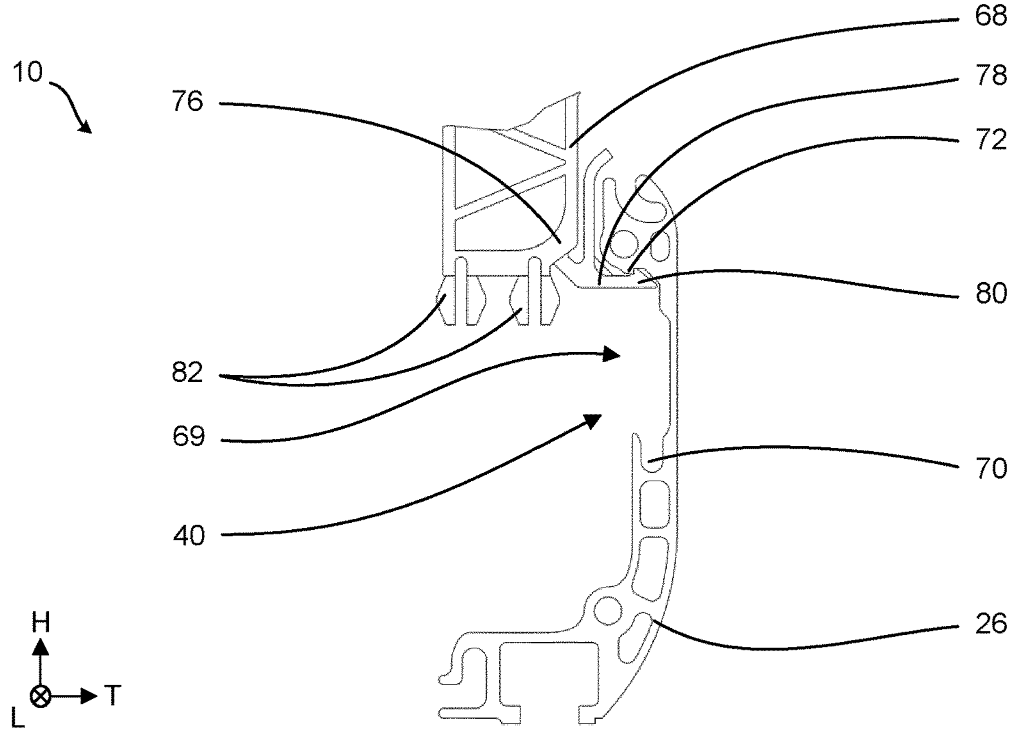
Figure 8:
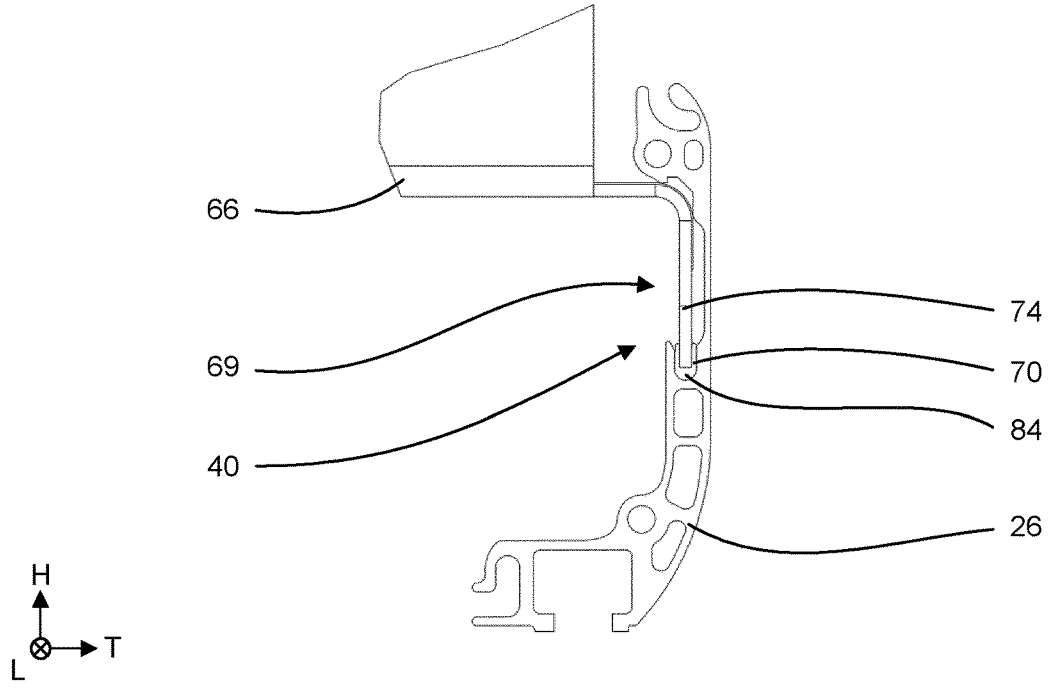

Turning now to FIGS. 6 to 8, the second mounting section 40 and the radiator assembly 16 are described in more detail.

The radiator assembly 16 comprises several radiators 64, a reflector 66 and a mounting bridge 68.

FIG. 6 shows a part of the reflector 66 with illustrated radiators 64, mounted to the rail 26 by means of the second mounting section 40.

Thus, the radiator assembly 16 is located in the interior volume of the housing 14 between the rails 26.

In the shown embodiment, the second mounting section 40 comprises a recess 69 in the rail 26, a second groove 70 and a latching element 72.

The second groove 70 extends from the recess 69 downwardly in the height direction H, i.e. towards the back.

At the other end of the recess 69, i.e. the front end, the latching element 72 is provided at the rail 26, in the shown embodiment as an undercut.

As can be seen in FIG. 8, in the shown embodiment, the reflector 66 has edges in the longitudinal direction L, which are bent towards the back forming a collar 74 of the radiator assembly. The edges may extend over the whole length in the longitudinal direction L or only sections of the edges are bent towards the back.

The end of the collar 74 extends through the recess 69 and into the second groove 70 so that it rests in the second groove 70. Thus, the radiator assembly 16 is supported by the rails 26.

Optionally, an insulating material 84, like an insulation foil may be present in the second groove 70 insulating the reflector 66 from the rail 26. The insulating material 84 prevents a galvanic contact between the reflector 66 and the rails 26. This will improve the linearity of the RF contacts and prevent passive intermodulation.

FIG. 7 illustrates the attachment of the mounting bridge 68 to the rail 26.

The mounting bridge 68 has a main portion 76 and a latching portion 78 extending from the main portion 76 in the traverse direction T towards the rail 26.

At the end of the latching portion 78, a counter element 80, for example a hook, is provided which engages in the latching element 72 of the second mounting section 40, in the shown embodiment the undercut.

Further, connection elements 82—in the shown embodiment hooks—are provided at the main portion 76 which extend in the height direction H towards the back.

The connection elements 82 may also be bolts, screws or the like.

Turning back to FIG. 6, which shows the fully mounted radiator assembly 16 in the housing 14, the reflector 66 and the mounting bridge 68 are mounted to each other by the connection elements 82. To this end, the reflector 66 comprises holes through which the connection elements 82 extend. Thus, the radiator assembly 16 and with that the radiators 64 and the reflector 66 are securely mounted within the housing 14.

In addition to the reflector 66, the back cover 30 may function as a sub-reflector.

As the rails 26 and the cover 28 are invariant in the longitudinal direction L, and are in particular extrusion parts, they can be cut in any length, so that the antenna 12 may have any length in the longitudinal direction L.

Further, the width of the antenna 13 in the traverse direction T can be changed by using different sized covers 28 and back covers 30. Nevertheless, the same rails 26 can be used.

In addition, as the housing 14 comprises several separate parts, it can be shipped in an unassembled fashion so that the space needed during shipping can be reduced drastically.

Thus, a very cost-efficient yet easy to assemble the antenna 12 is provided.

Figure 9:
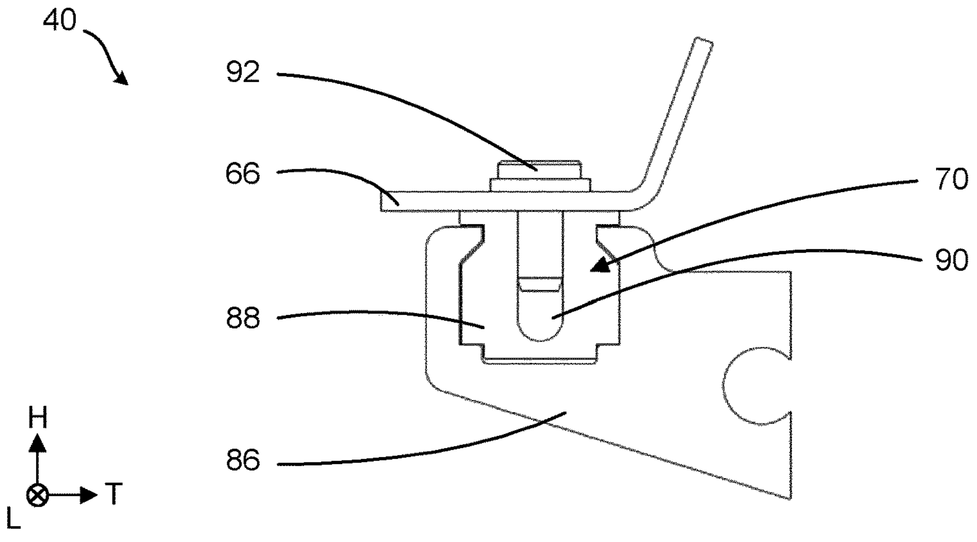
Figure 10:
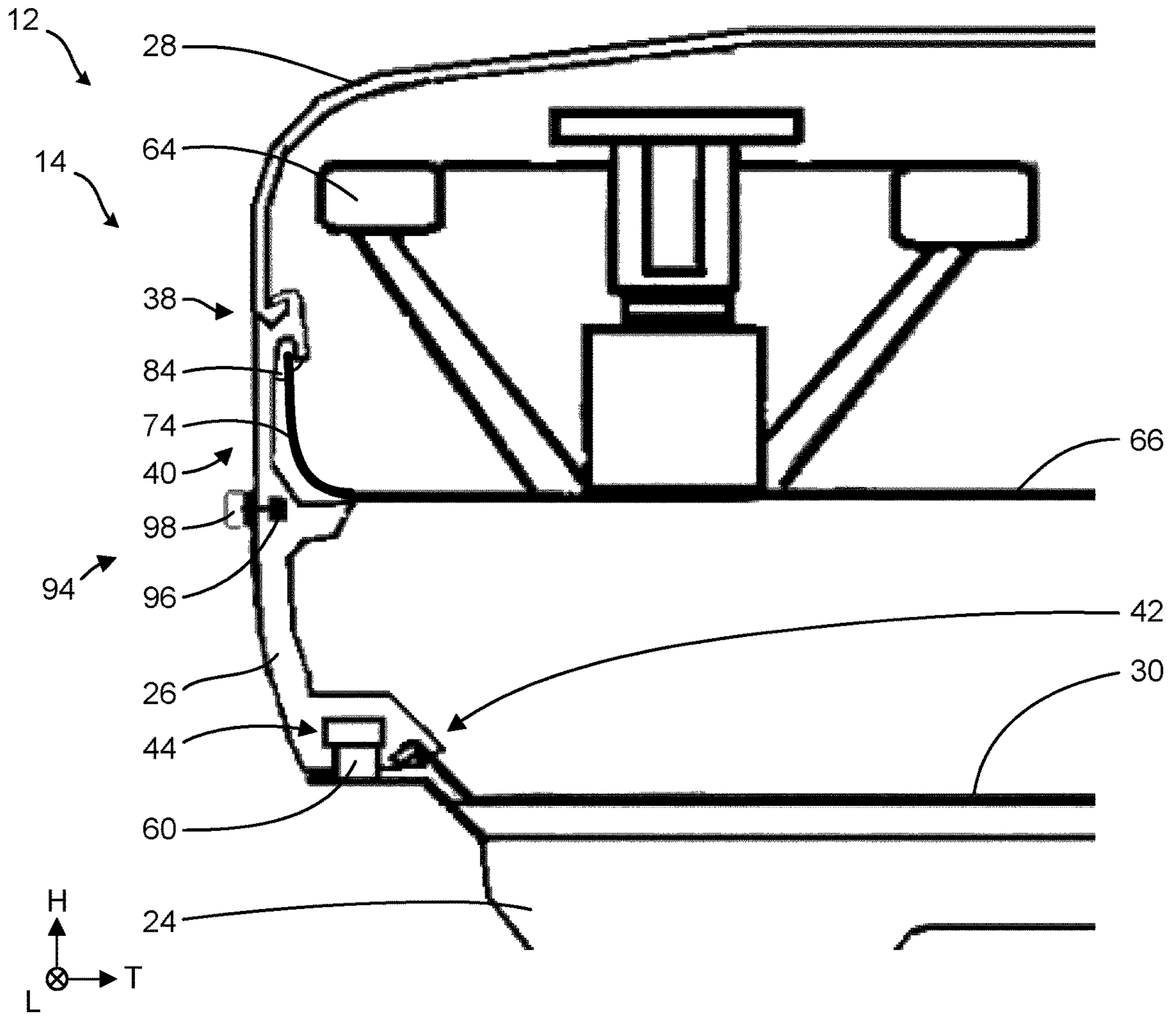
FIG. 10: shows a cross-section of a third embodiment of an antenna according to the invention.

FIGS. 9 and 10 show a second and third embodiment of an antenna 12 according to the invention, which are substantially the same as the first embodiment. Thus, only the differences will be explained in the following and same and functionally the same parts are labeled with the same reference numbers.

FIG. 9 shows a second embodiment of the antenna 12, namely a detailed view of a part of the radiator assembly 16 and the second mounting section 40 of the rail 26.

In this second embodiment, the second mounting section 40 comprises a cantilever 86 extending inwardly and having the second groove 70 provided at its end.

The second groove 70 is open in the height direction H towards the front and a mounting piece 88 is located in the second groove 70.

The mounting piece 88 has a cross-section complementary to the cross-section of the second groove 70 and comprises an opening 90, in particular a threaded opening.

The reflector 66 is placed onto the mounting piece 88 and fixed to the mounting piece 88 using a bolt or a screw 92 extending into the opening.

In particular, a section of the reflector 66 extending fully in the traverse direction is fixed to the mounting piece 88.

FIG. 10 shows a cross-section of the antenna 12 according to a third embodiment according to the invention. For reasons of clarity, the mounting bridge 68 is not shown.

In difference to the first embodiment, the first groove 46 of the first mounting section 38 and thus the edge of the cover 28 has a different shape, namely the first groove 46 extends inwardly.

Likewise, the third groove 48 of the third mounting section 42 has a different shape and is bent towards the back. Further, no gasket 50 is provided.

Concerning the second mounting section 40, the position of the second groove 70 and the latching element 72 have changed, meaning that the second groove 70 is nearer to the front as the latching element 72.

The collar 74 of the reflector 66 is also inserted into the second groove 70. However, an insulating material 84, for example in insulation foil is provided in the second groove 70 so that insulation between the reflector 66 and the rail 26 is provided.

Further, the rails 26 according to the second embodiment have a fifth mounting section 94 with a fifth groove 96 extending on the outer side of the rails 26.

The fifth mounting section 94 is located between the fourth mounting section 44 and the first mounting section 38 in the height direction H.

The antenna 12 comprises an aerodynamically active part 98, in the shown embodiment a spoiler, which is mounted in the fifth groove 96 and extends on the outer side of the rail 26 in the longitudinal direction L.

Thus, the aerodynamically active part 98 is located at the outer side of the rail 26.

By using an aerodynamically active part 98, wind loads on the antenna 12 can be reduced drastically.

The invention claimed is:

1. An antenna, in particular for a mobile communication cell site, comprising two rails, a cover and a radiator assembly with a plurality of radiators and a reflector, wherein the rails are parallel to each other, wherein the cover extends from one of the two rails to the other one of the two rails, and wherein the radiator assembly is located between the rails and is attached to one or both of the two rails, wherein the rails comprise each a second mounting section for the radiator assembly and wherein the second mounting section comprises a latching element, wherein a mounting bridge of the radiator assembly engages with the latching element.

2. The antenna according to claim 1, wherein the rails and the cover define a housing with an interior volume, wherein the radiator assembly is located within the housing.

3. The antenna according to claim 1, wherein the antenna has a front, a back and two head ends, wherein the rails extend in the longitudinal direction (L) between the two head ends, in particular fully, and/or in the height direction (H) between the front and the back.

4. The antenna according to claim 1, wherein the rails comprise each a first mounting section for the cover.

5. The antenna according to claim 4, wherein the first mounting section is located at the front end of the cross-section of the respective rail and/or wherein the first mounting section comprises a first groove for receiving the cover.

6. The antenna according to claim 5, wherein the cover has two parallel edges extending in the longitudinal direction (L) having a geometry in the cross-section complimentary to the geometry of the first grooves of the first mounting section, in particular wherein the edges of the cover are inserted in the first grooves via the end faces of the respective rail.

7. The antenna according to claim 4, wherein the second mounting section comprises a second groove for receiving the radiator assembly.

8. The antenna according to claim 7, wherein an insulating material, in particular an insulation foil, is present in the second groove between the rail and the reflector.

9. The antenna according to claim 1, wherein the antenna comprises a back cover attached to one or both of the two rails, in particular at the back of the cross-section of the respective rail.

10. The antenna according to claim 9, wherein the rails comprise a third mounting section for the back cover, in particular wherein the third mounting section comprises a third groove for receiving the back cover.

11. The antenna according to claim 1, wherein the rails each have a fourth mounting section, wherein the fourth mounting section comprises a fourth groove, in particular wherein a nut is located in the fourth groove for mounting parts to the rail.

12. The antenna according to claim 11, wherein the antenna comprises an electronic module, in particular a transceiver, attached to the rail via the fourth mounting section, and/or a pole mounting element attached to the rail via the fourth mounting section.

13. The antenna according to claim 1, wherein the antenna has at least one stiffener plate located at a head end which is fixedly attached to the respective end faces of the two rails, in particular wherein the stiffener plate has at least one opening for a cable or a cable connector.

14. The antenna according to claim 1, wherein the antenna comprises at least one cap having a base and a collar extending from the edge of the cap, wherein the cap, in particular the base, is attached to an end face of one or both of the two rails and the collar extends around the rail and the cover.

15. The antenna according to claim 1, wherein at least one of the head ends of the antenna, the end face of the rail and the end face of the cover are offset from one another in the longitudinal direction (L) by a distance (D), in particular wherein the length (C) of the collar of the cap is larger than the distance (D) of the offset.

16. The antenna according to claim 1, wherein the rails have an invariant cross-section in the longitudinal direction (L) and/or wherein the rails are identical to one another.

17. The antenna according to claim 1, wherein the rails are made of metal and/or are manufactured by extrusion and/or wherein the cover is made from a thermoplastic material.

18. The antenna according to claim 1, wherein the rails each have a fifth mounting section for receiving aerodynamically active parts, in particular the fifth mounting section having at least one groove and/or being located at the outer side.

19. A mobile communication cell site comprising the antenna according to claim 1.

* * * * *